Figure 1:
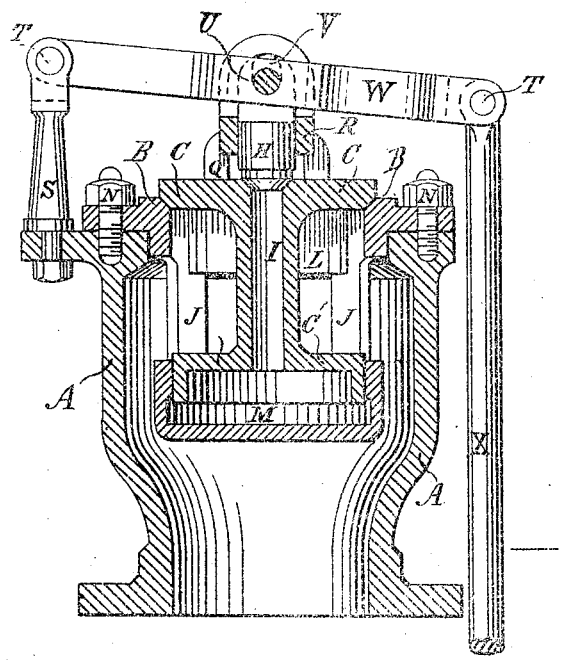

(No Model.)

W. A. PENDRY.
BALANCED THROTTLE VALVE.

No. 360,171. Patented Mar. 29, 1887.

WITNESSES
Edward J. Gatt
Sumner Collins

INVENTOR.
William A. Pendry
by Geo. H. Lothrop,
atty.

UNITED STATES PATENT OFFICE.

WILLIAM ALLEN PENDRY, OF DETROIT, MICHIGAN.

BALANCED THROTTLE-VALVE.

SPECIFICATION forming part of Letters Patent No. 360,171, dated March 29, 1887.

Application filed January 11, 1886. Renewed December 2, 1886. Serial No. 220,550. (No model.)

*To all whom it may concern:*

Be it known that I, WILLIAM ALLEN PENDRY, of Detroit, in the county of Wayne and State of Michigan, have invented a new and useful Improvement in Balanced Valves, of which the following is a specification.

My invention consists in an improved balanced throttle-valve, the principle of which is exactly the same as that of the valve patented by me August 7, 1883, No. 282,766, but is shown in the drawings as applied to a straight-way valve, and with a slight structural change in the method of attachment of the stem to the valve.

Figure 2:
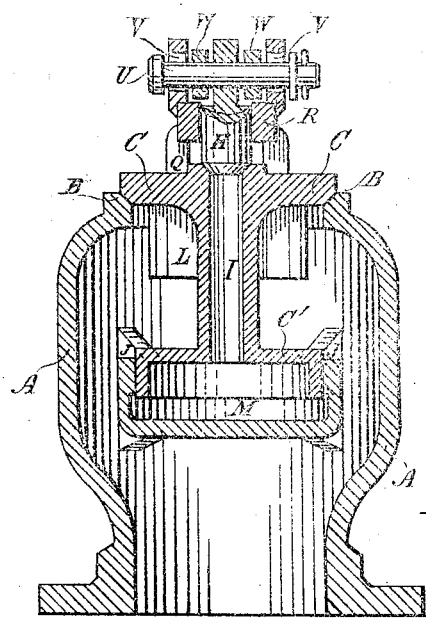

Figures 1 and 2 are vertical central sections through the valve at right angles to each other.

A represents a shell having a seat, B, formed at its upper end, either by being turned on the shell, as in Fig. 2, or by being made in brass and bolted to the upper end of the shell, as in Fig. 1.

M represents a pot in the shape of a cylinder open at the upper end and closed at the lower end, suspended within the shell A below the valve-seat, either by arms J, extending down from the valve-seat, as in Fig. 1, in which case the valve-seat and pot are cast together and bored at one operation, or by wings J, projecting from the inner wall of shell A, as in Fig. 2, in which case the pot may be cast in the shell. The arms or wings J in either case perform no function but to support the pot M, and the manner of their construction is immaterial.

C represents the valve, adapted to close seat B, and extending through the seat, as in my former patent, to the pot M, and there enlarged, C', to fit said pot, but not necessarily to fit closely.

I represents a steam-passage extending entirely through valve C, and having a valve-seat formed at its upper end.

L L represent wings or fair-leaders formed on the valve C, extending through the seat B, simply to guide the valve, and their construction may be in any known manner.

H represents the valve-stem, the lower end of which is made in the form of a valve, adapted to close the valve-seat in the upper end of passage I, and connected by a pin, U, with a lifting-lever, W, pivoted at T T to a support, S, fastened to the shell A and to a connecting-rod, X. On the upper face of the valve C is formed a short cylinder, R, connected with the valve by one or more wings, Q, and rising far enough to receive the pin U through slots V, formed therein. The stem H lies within cylinder R, and when lever W is lifted it first raises stem H and then raises the valve C, pin U working in the slots V. The lever W, as shown in the drawings, is bifurcated to pass around stem H.

The arrangement shown in the drawings is intended for a locomotive throttle-valve, and the arrangement of lifting-levers shown is suitable for such a valve, as it must lie within the steam-dome and be operated from without the boiler, and it will be readily understood that when my invention is to be used in any other place—as, for instance, in an ordinary straight-way valve or in a globe or angle valve, in which the shell extends above as well as below the seat—any of the usual methods of lifting the stem and valve—as, for instance, a screw passing through a stuffing-box in the shell—may be substituted for and will be a simple mechanical equivalent for the lifting-levers shown, the only function of said lever being to first raise the stem H and subsequently to raise the valve C, there being many known devices for accomplishing this function.

The shell A is shown as enlarged around the pot M, to give a free steam-passage therethrough, and is provided at its lower end with a flange, by which it may be bolted to a steam-pipe.

N N represent bolts, by which seat B is secured to the shell A when made separate from said shell.

The operation of my invention is as follows: The valve being closed, as shown, and under steam-pressure, considerable force is necessary to open it. When lever W is raised, it lifts stem H and opens passage I, and as the area of this passage is comparatively small a small amount of force will raise stem H. Steam rushes through passage I and fills pot M, where it is confined and presses on the lower end of valve C, thus balancing the valve, and it is evident that by changing the relative areas of the ends of valve C the balancing effect of the steam may be varied at will. As the lever W continues to rise the pin U comes in contact with the upper ends of slots V in cylinder R, and raises said cylinder, and with it the valve C, which lifts freely and easily. Steam passes through the valve-seat B into shell A, through the openings between the arms or wings J, around pot M, and off through the pipe connected with the shell A. When lever W is lowered, stem H closes the passage I and prevents access of steam thereto, so that there is a steam-pressure on the whole area of the upper end of valve C and no balancing-pressure on the lower end thereof, so that the valve remains firmly closed. Steam passes into the passage I when stem H is raised through the openings between wings Q.

It is evident that the form of cylinder R and its connection with the lifting mechanism may be greatly varied without departing from my invention, the form being immaterial so long as the cylinder constitutes an attachment between the valve C and the lifting mechanism, by which the lifting mechanism will first raise the stem H and then raise valve C.

What I claim as my invention, and desire to secure by Letters Patent, is—

1. The combination, with the shell of a valve, of a seat formed in or on said shell, a pot suspended below said seat, a valve adapted to close said seat and extending through said seat into said pot, and having a passage therethrough, a valve-stem adapted to close said passage through said valve, lifting mechanism connected with said stem, and a lost-motion connection between said valve and the lifting mechanism, whereby the action of the lifting mechanism will first raise said valve-stem and then raise the valve, substantially as shown and described.

2. In combination with the valve C, having the passage I therethrough, the stem H, lifting mechanism connected with said stem, and a lost-motion connection between the upper end of valve C and the lifting mechanism, substantially as shown and described.

3. The combination, with a valve-shell and seat, of a pot suspended below said seat by a skeleton support, and valve C, with its enlargement C′, substantially as shown and described.

WM. ALLEN PENDRY.

Witnesses:
SUMNER COLLINS,
GEO. H. LOTHROP.